United States Patent
Pallath

(10) Patent No.: US 10,007,644 B2
(45) Date of Patent: Jun. 26, 2018

(54) DATA ANALYTIC CONSISTENCY OF VISUAL DISCOVERIES IN SAMPLE DATASETS

(71) Applicant: SAP SE, Walldorf (DE)

(72) Inventor: Paul Pallath, Bangalore (IN)

(73) Assignee: SAP SE, Walldorf (DE)

( * ) Notice: Subject to any disclaimer, the term of this patent is extended or adjusted under 35 U.S.C. 154(b) by 888 days.

(21) Appl. No.: 14/306,265

(22) Filed: Jun. 17, 2014

(65) Prior Publication Data

US 2015/0363519 A1    Dec. 17, 2015

(51) Int. Cl.
*G06F 17/18* (2006.01)
*G06Q 10/10* (2012.01)

(52) U.S. Cl.
CPC ............ *G06F 17/18* (2013.01); *G06Q 10/10* (2013.01)

(58) Field of Classification Search
CPC ................................ G06F 17/18; G06Q 10/10
See application file for complete search history.

(56) References Cited

U.S. PATENT DOCUMENTS

| | | | | |
|---|---|---|---|---|
| 6,865,567 | B1* | 3/2005 | Oommen | G06F 17/30536 |
| 7,054,497 | B2* | 5/2006 | Caviedes | H04N 19/176 |
| | | | | 375/E7.14 |
| 7,720,782 | B2* | 5/2010 | Chaudhury | G06N 99/005 |
| | | | | 706/46 |
| 7,945,483 | B2* | 5/2011 | Inghelbrecht | G06Q 10/067 |
| | | | | 705/26.1 |
| 8,842,916 | B2* | 9/2014 | Pollard | G06K 9/00161 |
| | | | | 382/190 |
| 9,424,318 | B2* | 8/2016 | Anand | G06F 17/3053 |
| 2014/0156806 | A1* | 6/2014 | Karpistsenko | H04L 29/06027 |
| | | | | 709/219 |
| 2014/0200953 | A1* | 7/2014 | Mun | G06Q 10/04 |
| | | | | 705/7.28 |

OTHER PUBLICATIONS

Mysliwiec, L., et al. "How to Determine If a Sample Is Representative" (2012) available at <http://www.analyticbridge.datasciencecentral.com/forum/topics/howtodetermineifasampleisrepresentative>.*
Dufour, J., et al. "Simulation-Based Finite-Sample Normality Tests in Linear Regressions" J. Econometrics (1998).*
Koizumi, K., et al. "Modified Jarque-Bera Type Tests for Multivariate Normality in a High-Dimensional Framework" J. Statistical Theory & Practice, vol. 8, issue 2, pp. 382-399 (2014; published online Jul. 2013).*

* cited by examiner

*Primary Examiner* — Jay B Hann
(74) *Attorney, Agent, or Firm* — Fish & Richardson P.C.

(57) ABSTRACT

Actual values of statistical signatures are computed. The actual values of statistical signatures correspond to analytical elements of a sample dataset. The computed actual values are discretized by assigning bucket values to the computed actual values. An aggregate score based on the assigned bucket values are computed. The assigned bucket values correspond to the analytical elements. The analytical elements of the sample dataset are ranked, based on the computed aggregate score. Combination of analytical elements is identified, and cumulative rank is computed based on the individual ranks of the analytical elements in the combination. The combinations of analytical elements are automatically displayed in a user interface associated with automatic visual discoveries.

17 Claims, 13 Drawing Sheets

| DIM A | DIM B | DIM C | MES A 310 | MES B 320 | MES C 330 | MES D | MES E | MES F | MES G | MES H | ... |
|---|---|---|---|---|---|---|---|---|---|---|---|
| 1/17/2013 | Thursday | Texas | 1451 | 175 | 8 | -7 | 1038 | -6 | 1851 | 10 | ..... |
| 1/18/2013 | Friday | Texas | 1459 | 178 | 7 | -8 | 1037 | 28 | 1935 | 5 | ..... |
| 1/19/2013 | Saturday | Texas | 1515 | 201 | 9 | -5 | 1035 | -6 | 2137 | 5 | ..... |
| 1/20/2013 | Sunday | Texas | 1455 | 176 | 4 | -8 | 1037 | 1 | 1831 | 3 | ..... |
| 1/21/2013 | Monday | Texas | 1446 | 162 | 9 | -1 | 1044 | 78 | 1835 | 6 | ..... |
| 1/22/2013 | Tuesday | Texas | 1502 | 171 | 8 | 9 | 1054 | 1 | 1834 | 4 | ..... |
| 1/23/2013 | Wednesday | Texas | 1504 | 186 | 10 | -9 | 1036 | -5 | 1827 | 3 | ..... |
| 1/24/2013 | Thursday | Texas | 1520 | 204 | 9 | -9 | 1036 | -3 | 1831 | 4 | ..... |
| 1/25/2013 | Friday | Texas | 1525 | 174 | 35 | -3 | 1042 | -4 | 1827 | 9 | ..... |
| 1/26/2013 | Saturday | Texas | 1509 | 189 | 12 | -6 | 1034 | 2 | 1844 | 3 | ..... |
| 1/27/2013 | Sunday | Texas | 1506 | 188 | 3 | -3 | 1042 | 13 | 1916 | 3 | ..... |
| 1/31/2013 | Thursday | Texas | 1520 | 156 | 14 | 14 | 1059 | 4 | 1440 | 6 | ..... |
| 1/1/2013 | Tuesday | New York | 29 | 220 | 5 | 59 | 1939 | 25 | 644 | 4 | ..... |
| 1/2/2013 | Wednesday | New York | 2333 | 208 | 6 | 8 | 1848 | 201 | 1225 | 7 | ..... |
| 1/3/2013 | Thursday | New York | 1925 | 234 | 10 | 12 | 1617 | -9 | 1221 | 7 | ..... |
| 1/4/2013 | Friday | New York | 1926 | 209 | 6 | 38 | 1643 | 38 | 1216 | 5 | ..... |
| ..... | ..... | ..... | ..... | ..... | ..... | ..... | ..... | ..... | ..... | ..... | ..... |
| 1/9/2013 | Wednesday | New York | 1932 | 260 | 8 | 0 | 1605 | -6 | 1328 | 4 | ..... |
| 1/10/2013 | Thursday | New York | 1856 | 240 | 6 | -4 | 1601 | 0 | 1217 | 6 | ..... |
| KURTOSIS | 0 | 0 | 6.25327 340 | 12.179899 | 20.138114 | 16.29 | 22.68 | 26.579 | 33.135 | 43.101 | |
| SKEWNESS | 0 | 0 | 1.20577 350 | 1.5525665 | 2.2194719 | 3.058 | 3.136 | 4.0138 | 6.3528 | 9.071 | |

FIG. 3

|  |  | KURTOSIS | SKEWNESS |
|---|---|---|---|
|  | DIM A | 0 | 0 |
|  | DIM B | 0 | 0 |
|  | DIM C | 0 | 0 |
|  | MES A 405 | 6.253268115 | 1.205768205 |
|  | MES B | 12.17989877 | 1.552566538 |
|  | MES C | 20.13811402 | 2.219471918 |
|  | MES D | 16.29368161 | 3.058153451 |
|  | MES E | 22.6789 | 3.135654247 |
|  | MES F | 26.5789 | 4.013756393 |
|  | MES G | 33.13456 | 6.352751483 |
|  | MES H | 43.10110459 | 9.071025462 |
|  | MES I | 54.87567 | 9.371025462 |
|  | MES J | 130.1782829 | 9.671025462 |
|  | MES K | 134.8179222 | 13.00992017 |
|  | MES L | 181.6877513 | 13.89652017 |
|  | ...... | ...... | ...... |
| STANDARD DEVIATION |  | 53.27197755 420 | 2.856625023 440 |
| MEAN |  | 37.22114357 430 | 3.7076611 450 |

| | KURTOSIS | BUCKET VALUES |
|---|---|---|
| DIM A | 0 | |
| DIM B | 0 | |
| DIM C | 0 | |
| MES A 710 | 6.253268  720 | 1 730 |
| MES B | 12.17989877 | 2 |
| MES C | 20.13811402 | 3 |
| MES D | 16.29368161 | 3 |
| MES E | 22.6789 | 4 |
| MES F | 26.5789 | 5 |
| MES G | 33.13456 | 6 |
| MES H | 43.10110459 | 8 |
| MES I | 54.87567 | 10 |
| MES J | 130.1782829 | 24 |
| MES K | 134.8179222 | 25 |
| MES L | 181.6877513 | |
| ...... | | |

FIG. 7

| MEASURE 805 | BUCKET VALUES FOR KURTOSIS 810 | BUCKET VALUES FOR SKEWNESS 815 | AGGREGATE SCORE 825 | RANK 830 |
|---|---|---|---|---|
| MES A | 1 | 7 | 8 | 1 |
| MES B | 2 | 8 | 10 | 2 |
| MES C | 3 | 7 | 10 | 3 |
| MES D | 3 | 7 | 10 | 4 |
| MES E | 4 | 7 | 11 | 5 |
| MES F | 5 | 7 | 12 | 6 |
| MES G | 6 | 7 | 13 | 7 |
| MES H | 8 | 8 | 16 | 8 |
| MES I | 10 | 8 | 18 | 9 |
| MES J | 24 | 8 | 32 | 10 |
| MES K | 25 | 9 | 34 | 11 |
| MES L | 35 | 9 | 44 | 12 |
| ... | ... | ... | ... | ... |

FIG. 8

DATA ANALYTIC CONSISTENCY OF VISUAL DISCOVERIES IN SAMPLE DATASETS

BACKGROUND

Data analytics enables automatic discovery of useful information in enterprise data repositories. Various techniques and methodologies are adopted to find such useful information referred to as visualizations. Enterprise data repositories have data in range of terabytes or petabytes. In order to generate visualizations, sample data from the terabytes or petabytes of data are considered and used. Based on the selected sample dataset, visualizations are generated. However, sample dataset may not be representative of the entire data. Hence, when visualizations are generated from different sample datasets, they may vary significantly providing inconsistent results to analysts.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 3 illustrates a sample dataset generated dynamically, according to one embodiment.

FIG. 4 illustrates table showing statistical computation for analytical elements in a sample dataset, according to one embodiment.

FIG. 7 is a table illustrating discretization of actual values of statistical signature, according to one embodiment.

FIG. 8 is a table illustrating computing aggregate score and ranking analytical elements based on a first sample dataset, according to one embodiment.

DETAILED DESCRIPTION

Embodiments of techniques for improved consistency of visual discoveries are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
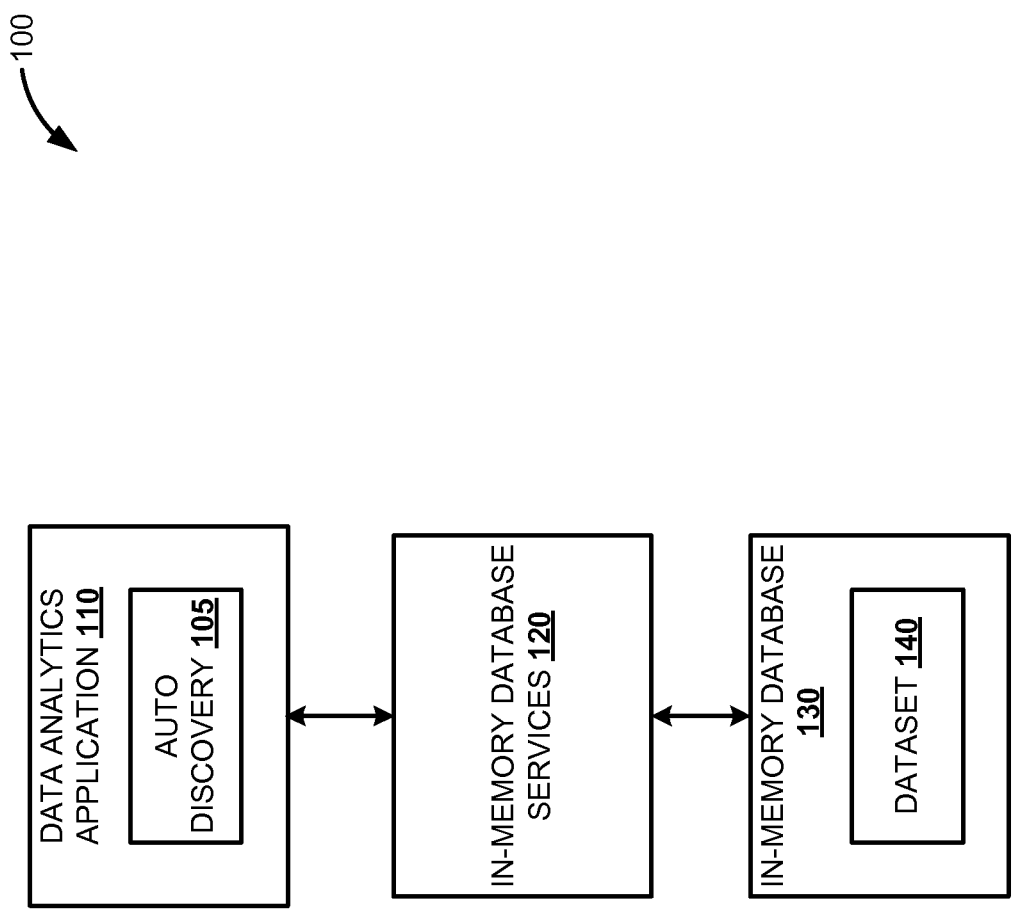
FIG. 1 is a block diagram illustrating an example environment for improved consistency of visual discoveries, according to one embodiment.

FIG. 1 is a block diagram illustrating example environment 100 for improved consistency of visual discoveries, according to one embodiment. The environment 100 as shown contains data analytics application 110, in-memory database services 120 and in-memory database 130. Merely for illustration, only representative number and types of systems are shown in FIG. 1. Other environments may contain more instances of data analytics applications and in-memory databases, both in number and type, depending on the purpose for which the environment is designed.

When 'auto discovery' 105 option in data analytics application 110 is selected/activated, an automatic request to in-memory database 130 is sent for performing data analytics operations on dataset 140 available in the in-memory database 130. This data analytics operation results in automatic identification of visual discoveries in the dataset 140. Visual discoveries are useful insights on data which can be in visual representation such as a pattern, graph, etc., using which analysts can infer useful behavior/pattern. A connection is established from the data analytics application 110 to the in-memory database 130 via in-memory database services 120. The connectivity between the data analytics application 110 and the in-memory database services 120, and the connectivity between the in-memory database services 120 and the in-memory database 130 may be implemented using any standard protocols such as Transmission Control Protocol (TCP) and/or Internet Protocol (IP), etc.

Figure 2:
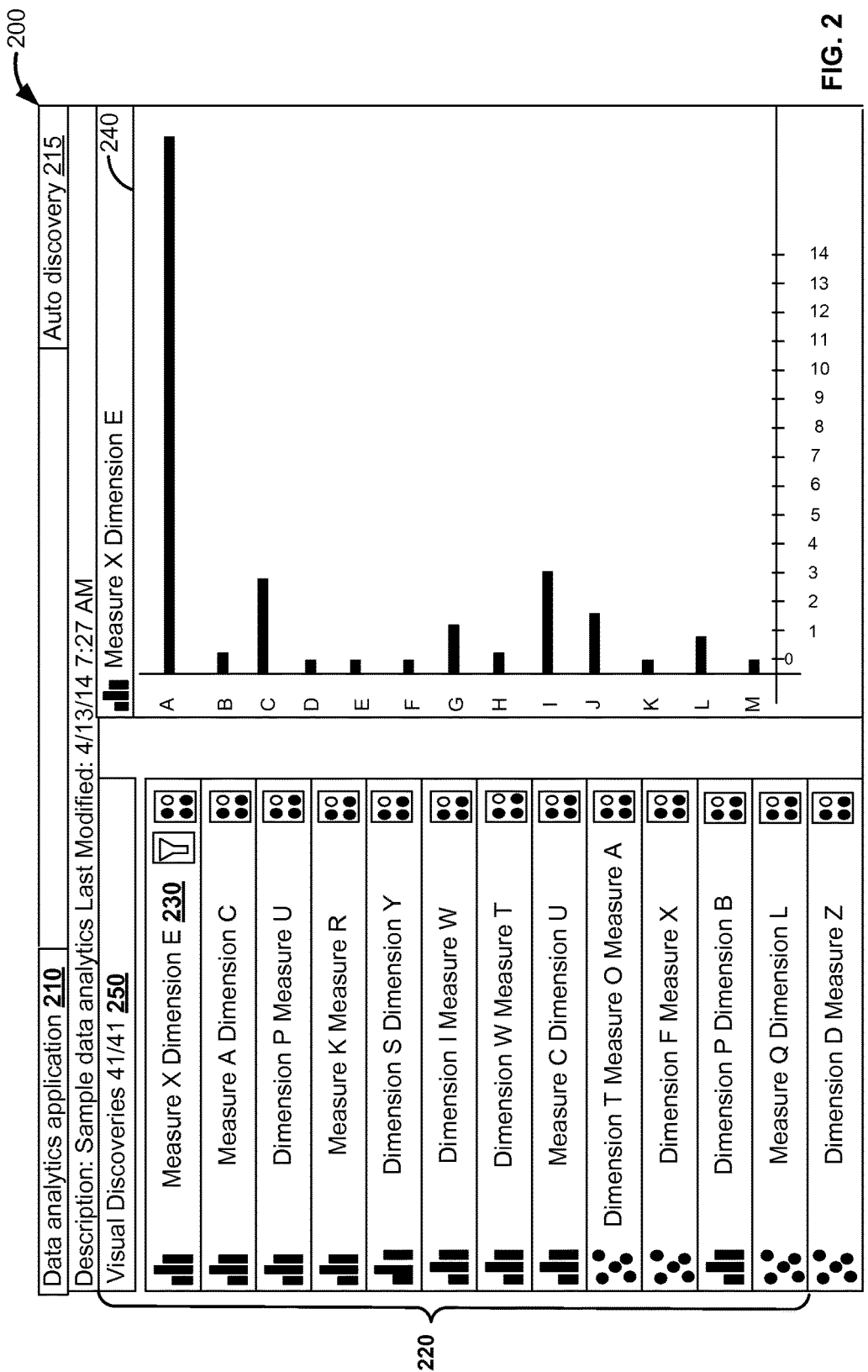
FIG. 2 is illustrating a user interface of a data analytics application, providing visual discoveries, according to one embodiment.

FIG. 2 is illustrating user interface 200 of a data analytics application, providing visual discoveries, according to one embodiment. For example, in the data analytics application 210 interface, an analyst clicks on 'auto discovery' 215 option to initiate a query for automatic visual discoveries. When the analyst triggers the query to initiate automatic visual discovery, a sample dataset is randomly selected from a master dataset, and visual discoveries are identified as results and displayed in result window 220. For example, one result of such visual discovery may be displayed in the result window 220 as 'Measure X Dimension E' 230. The analyst may select, e.g., click, on 'Measure X Dimension E' 230, and in response, a graphical representation of the 'Measure X Dimension E' may be displayed in graph window 240.

The visual discoveries displayed in the result window 220 are generated automatically based on the randomly selected sample dataset. Typically, a predetermined number of visual discoveries are displayed in the result window 220. For example, top 41 visual discoveries can be displayed in the result window 220 as shown in 'visual discoveries 41/41' 250. The visual discoveries may include dimensions and measures. In one embodiment, the visual discoveries may include a number of dimensions and measures. Identifying visual discoveries involves identifying analytical elements such as dimensions and measures, and identifying combination of analytical elements. These steps of identifying visual discoveries are illustrated in FIG. 3 to FIG. 10. The analyst clicks on 'auto discovery' 215 option again to initiate a query for automatic visual discoveries. When the analyst triggers the query to perform automatic visual discovery again, a different sample dataset is randomly selected from the master dataset. For the different sample dataset, a consistent set of visual discoveries are identified and displayed to the analyst in result window 220. FIG. 3 to FIG. 8 illustrate generating consistent visual discoveries irrespective of the sample dataset randomly selected from the dataset. Specifically FIG. 3 to FIG. 7 illustrate the steps involved in discretizing analytical elements.

FIG. 3 illustrates a sample dataset 300 generated dynamically, according to one embodiment. The sample dataset 300 is dynamically generated based on random selection of data from a master dataset, e.g., in response to a query from a data analytics application. Elements such as dimensions, measures, etc., in data warehouses, data marts, and analytical databases (including in-memory databases), etc., are referred to as analytical elements. Qualitative values or descriptive values are referred to as dimensions, and quantitative values are referred to as measures, these dimensions and measures are collectively referred to as analytical elements. The sample dataset 300 has some analytical elements such as dimensions 'DIM A', 'DIM B', 'DIM C', etc., and measures 'MES A', 'MES B', 'MES C', etc. In data analytics, statistical computations such as kurtosis, skewness, etc., are performed on the analytical elements of the dataset for generating visualizations. These statistical computations are referred to as statistical signatures.

For example, consider the measures 'MES A' 310, 'MES B' 320, 'MES C' 330, and perform any statistical signature computations such as kurtosis, skewness, distinct count, etc., on the considered measures. For example, consider an analytical element 'MES A' 310 and compute the statistical signature namely kurtosis using a mathematical formula on values '1451' to '1856' of 'MES A' 310. In one embodiment, the mathematical formula used for computing kurtosis is:

$$\text{Kurtosis} = \left\{ \frac{n(n+1)}{(n-1)(n-2)(n-3)} \sum \left( \frac{x_j - \bar{x}}{\sigma} \right)^4 \right\} - \frac{3(n-1)^2}{(n-2)(n-3)}$$

where 'σ' represents standard deviation, 'n' represents number of inputs, 'j' represents the range of records or data, $x_j$ represents the value in $j^{th}$ location and $\bar{x}$ represents mean. The computed kurtosis value for 'MES A' is '6.25327' as shown in 340. Similarly, the statistical signature namely skewness is computed using corresponding mathematical formula on values '1451' to '1856' of 'MES A'. In one embodiment, the mathematical formula used for computing skewness is:

$$\text{Skewness} = \left\{ \frac{n}{(n-1)(n-2)} \sum \left( \frac{x_j - \bar{x}}{\sigma} \right)^3 \right\}$$

where 'σ' represents standard deviation, 'n' represents the number of inputs, 'j' represents the range of records or data, $x_j$ represents the value in $j^{th}$ location and $\bar{x}$ represents mean.

The computed skewness value for 'MES A' is '1.20577' as shown in 350. The computed values of statistical signatures such as kurtosis '6.25327' 340 and skewness '1.20577' 350 are referred to as actual values of statistical signatures corresponding to analytical elements. Similarly, the statistical signatures such as kurtosis and skewness for the other analytical elements could be computed.

FIG. 4 illustrates table 400 showing statistical computation for analytical elements in a sample dataset, according to one embodiment. For example, for an analytical element measure 'MES A' 405, the computed statistical signatures such as kurtosis '6.253268115' and skewness '1.205768205' are shown in 410. This computation of kurtosis and skewness for the dimensions and measures are shown in FIG. 3. Similarly, for other dimensions and measures, the computed statistical signatures such as kurtosis and skewness are shown in the table 400. Based on these kurtosis values in column 415, standard deviation (σ) is computed as '53.27197755' as shown in 420, and mean (μ) is computed as '37.22114357' as shown in 430. Computation of standard deviation (σ) and mean (μ) is performed using standard mathematical formulae. Similarly, standard deviation (σ) and mean (μ) is computed for the statistical signature skewness as shown in 440 and 450 respectively.

Figure 5:
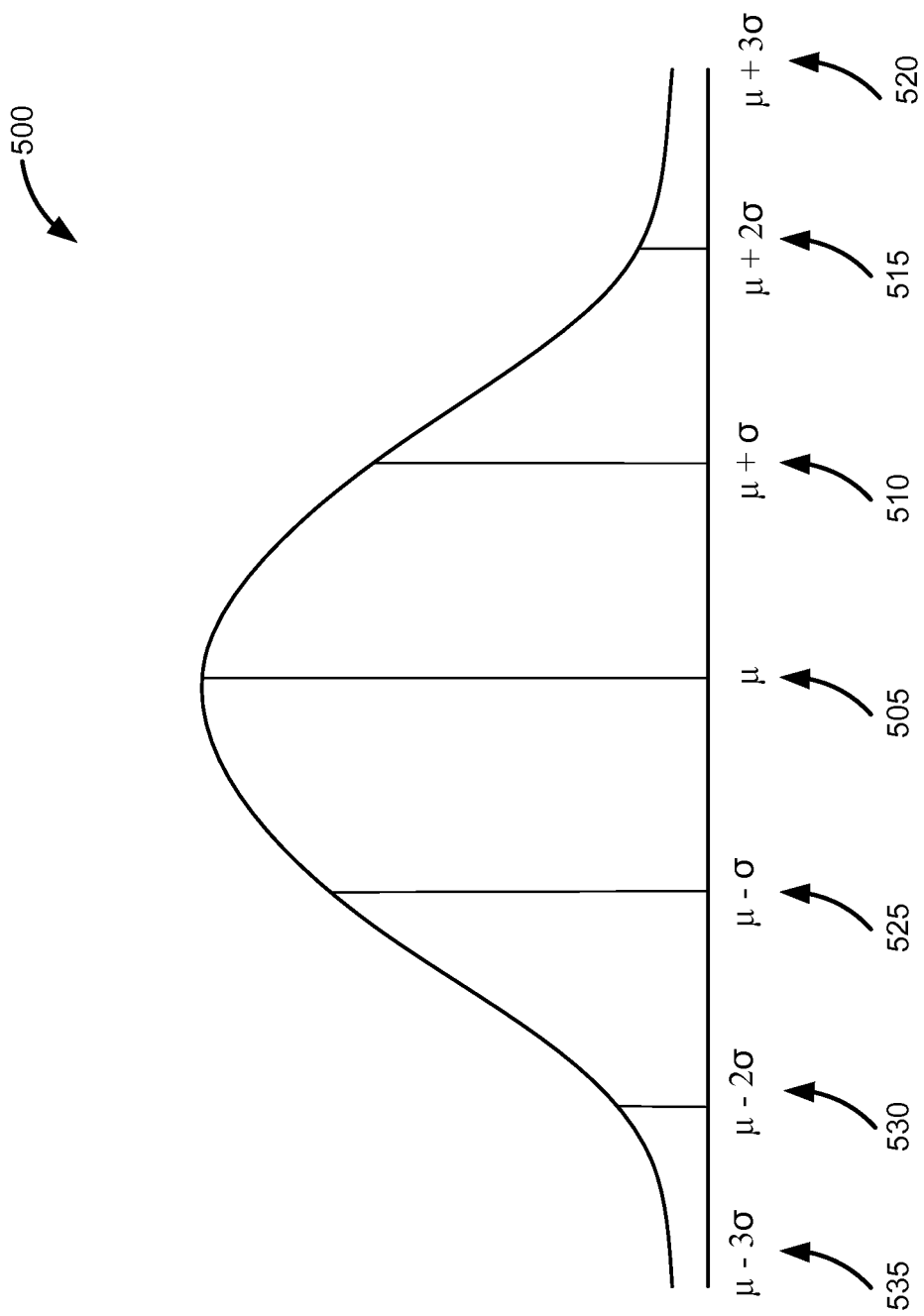
FIG. 5 illustrates a sample distribution curve, according to one embodiment.

FIG. 5 illustrates sample distribution curve 500, according to one embodiment. Since the dataset considered is a transactional dataset it typically follows a normal distribution. This normal distribution is represented in a commonly known bell curve. Normal distribution has symmetry about the center i.e. mean, and approximately half the values in the dataset are lesser than the mean, and the other half of the values in the dataset are greater than the mean. Data lies within a range to the left or right of the center, and the deviation from the center can be computed. Standard deviation of the distribution is the average spread from the mean. The range values for statistical signature is computed using the formula 'μ±xσ', where 'σ' represents standard deviation, 'μ' represents mean, and 'x' represents the step size which ranges, for example, from '−3' to '+3'. Here, range values for any statistical signature are computed using the property of statistics which states that most of the data in the distribution falls within '3' times the standard deviation of the mean i.e. within 'μ−3σ' and 'μ+3σ'. For example, the range values of a statistical signature can be computed with a step size of 1 i.e., x=1, such that the range values of the statistical signature 'μ+σ' 510, 'μ+2σ' 515, 'μ+3σ' 520 are computed to the right side of the mean ('μ' 505), and 'μ−σ' 525, 'μ−2σ' 530 and 'μ−3σ' 535 are computed to the left side of the mean ('μ' 505).

Figure 6:
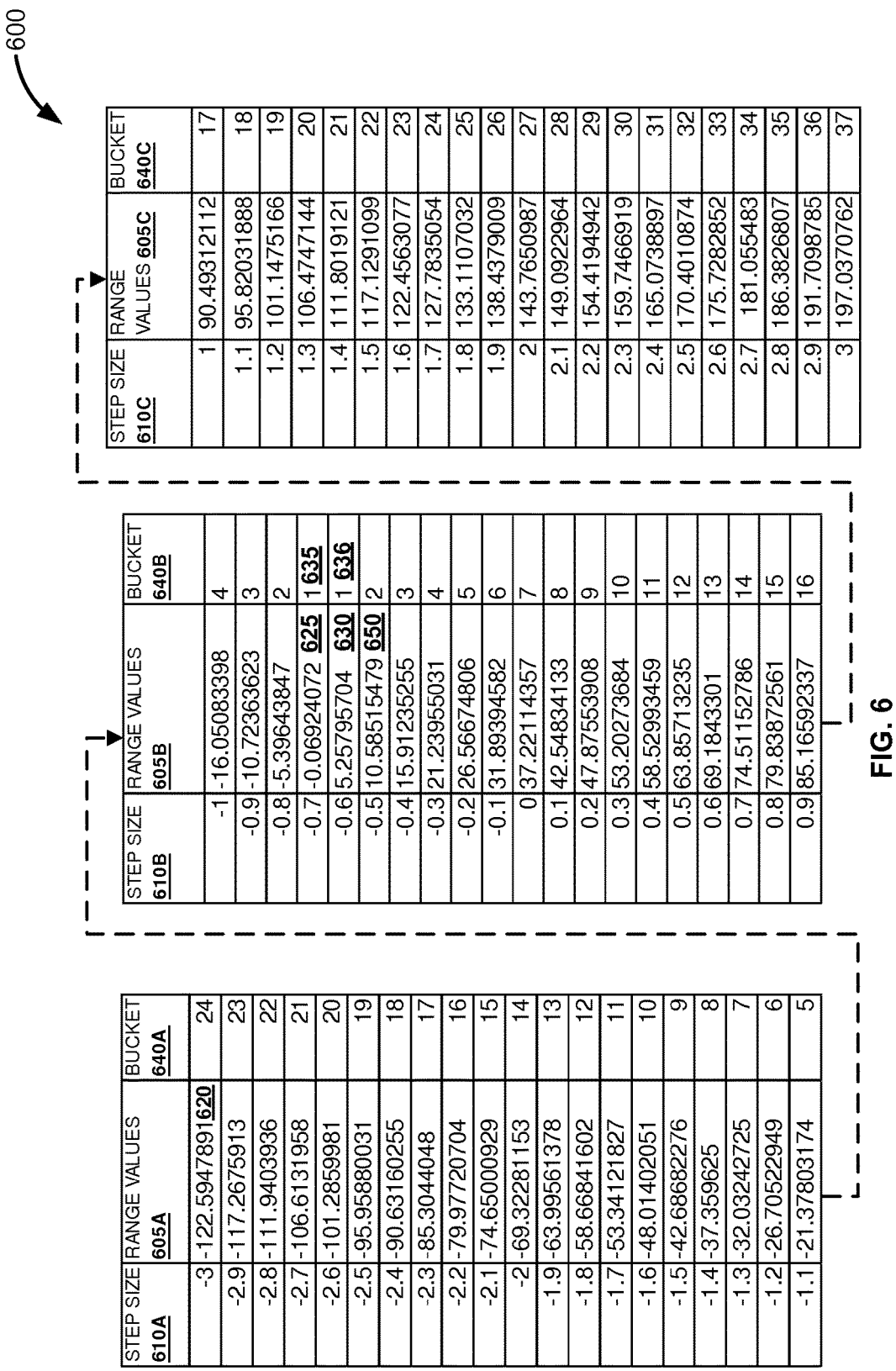
FIG. 6 is a table illustrating computation of range values for a statistical signature and assignment of bucket values, according to one embodiment.

FIG. 6 is a table illustrating computation of range values for a statistical signature and assignment of bucket values, according to one embodiment. In table 600, range values for a statistical signature, namely kurtosis, are computed as shown in columns 605 A, 605 B and 605 C. The range values for kurtosis are computed using the formula μ±xσ, where σ represents standard deviation, μ represents mean, and x represents the step size which ranges from '−3' to '+3'. For example, the interval between the step sizes is considered as 0.1 and the computed step sizes are shown in columns 610 A, 610 B and 610 C. The range values of kurtosis are computed based on the computed step sizes, the standard deviation (σ) '53.2719775' of kurtosis as computed in 420 of FIG. 4, and the mean (μ) '37.22114357' of kurtosis as computed in 430 of FIG. 4. For example, with the step size x as '−3', σ as '53.2719775' and μ as '37.22114357', the range value for kurtosis is computed using the formula μ±xσ as (37.22114357−3*53.2719775)='−122.5947891' as shown in 620. Similarly, the range values for kurtosis are computed for all other step sizes and the computed range values for kurtosis are shown in columns 605 A, 605 B and 605 C. These computed values are actual values of range values for kurtosis. In order to discretize the actual values, the actual values of range values for kurtosis are assigned a corresponding bucket value.

To determine the bucket values, the actual range values for kurtosis are examined to identify the location of range value '0'. Higher the positive range values or lower the negative range values of statistical signatures, interesting are the measures. Whereas, if the range values of statistical signatures are '0' such measures are not of interest and are avoided. Accordingly, boundary of the positive and negative range values are considered, and bucket values are assigned on either side in increasing order to include the extreme positive and negative range values of statistical signatures. Accordingly, it is determined that the range value '0' lies between two specific range values '−0.06924072' and '5.25795704' as shown in 625 and 630. Therefore, a bucket value of '1' is assigned to these two specific values '−0.06924072' and '5.25795704' as shown in 635 and 636. Bucket values in increment of 1 are assigned to the rest of the actual range values for kurtosis. The actual range values follow a normal distribution. Accordingly, the actual range of positive values from '5.25795704' to '197.0371' are assigned bucket values in ascending order from '1' to '37' as shown in columns 640 B and 640 C. Similarly, the actual range of negative values from '−0.06924072' to '−122.5947891' are assigned bucket numbers in ascending order from '1' to '24' as shown in columns 640 B and 640 A. Thus, table 600 may be used as a reference table to discretize the actual values of statistical signatures corresponding to analytical elements.

FIG. 7 is a table illustrating discretization of actual values of statistical signature, according to one embodiment. Table 700, shows the actual values of statistical signature, namely kurtosis, for the analytical elements such as dimensions and measures computed as shown in table 400 of FIG. 4. For example, consider an analytical element such as measure 'MES A' 710 with an actual value of kurtosis as '6.253268' 720. To discretize this actual value of kurtosis '6.253268', the actual value of kurtosis '6.253268' is compared with the range values for kurtosis computed in columns 605 A, 605 B and 605 C of FIG. 6 to determine the closest range values for kurtosis within which the actual value of kurtosis '6.253268' lies. For the actual value of kurtosis '6.253268' 720, the closest range values for kurtosis are '5.25795704' 630 of FIG. 6 with a bucket value of '1' and '10.58515479' 650 of FIG. 6 with a bucket value of '2'. The actual value of kurtosis '6.253268' 720 is greater than the range value of kurtosis '5.25795704' 630 but lesser than the range value of kurtosis '10.58515479' 650. Accordingly, the bucket value '1' associated with the lower range value of kurtosis '5.25795704' 630 is assigned to the actual value of kurtosis '6.253268' 720. The actual value of kurtosis '6.253268' 720 is discretized to a value of '1' 730. Similarly, all the actual values of kurtosis for the measures are discretized.

FIG. 8 is a table illustrating computing aggregate score and ranking analytical elements based on a first sample dataset, according to one embodiment. In table 800, the analytical elements such as measures 'MES A', 'MES B', 'MES C', etc., along with the discretized bucket values for kurtosis as determined in table 700 of FIG. 7 is shown. The measures in column 805 are based on a first sample dataset generated dynamically from a dataset. Column 810 contains the discretized bucket values for kurtosis corresponding to measures 'MES A', 'MES B', 'MES C', etc. Column 815 contains the discretized bucket values for skewness corresponding to the measures 'MES A', 'MES B', 'MES C', etc. In one embodiment, aggregate score is computed by summing the discretized bucket values for kurtosis and skewness in column 825. For example, aggregate score for 'MES A' is computed as '8' by adding the discretized bucket values for kurtosis '1' and skewness '7' as shown in 820. Computing aggregate score by summing is merely exemplary, various other techniques such as normalization, assigning weights to buckets, sorting based on a specified criteria, etc., can be used. Based on the computed aggregate score as shown in column 825, measures may be ranked. In this example, the computed aggregate score is ranked in ascending order from 1 to 12 as shown in column 830. The measures corresponding to higher ranks are considered for computing combination of analytical elements and for generating visual discoveries.

Figure 9:
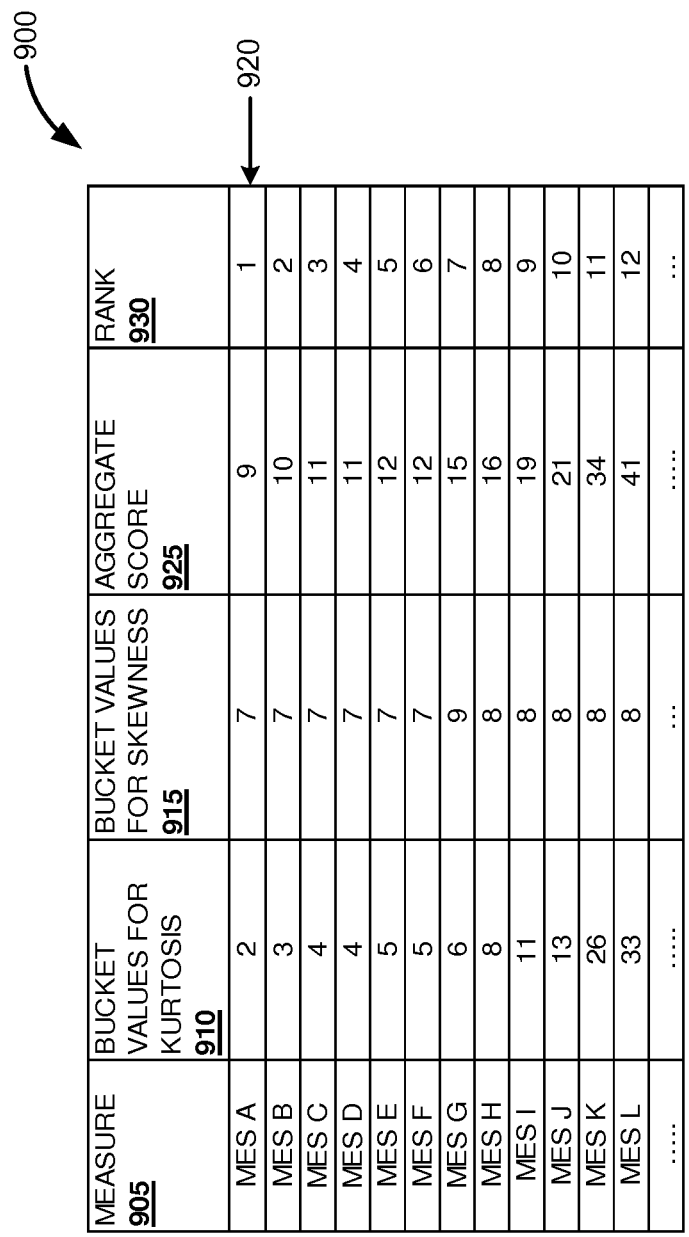
FIG. 9 is a table illustrating computing aggregate score and ranking analytical elements based on a second sample dataset, according to one embodiment.

FIG. 9 is a table illustrating computing aggregate score and ranking analytical elements based on a second sample dataset, according to one embodiment. In table 900, the analytical elements such as 905 measures 'MES A', 'MES B', 'MES C', etc., along with the discretized bucket values for kurtosis and skewness are shown. The measures in table 900 are based on a second sample dataset (not shown) generated dynamically from the dataset. Columns 910 and 915 indicate the discretized bucket values for statistical signature kurtosis and skewness corresponding to the analytical elements such as measures 'MES A', 'MES B', 'MES C', etc. In one embodiment, aggregate score is computed by adding the discretized bucket values for kurtosis and skewness as shown in column 925. For example, aggregate score for 'MES A' is computed as '9' by adding the discretized bucket values for kurtosis '2' and skewness '7' as shown in 920. Based on the computed aggregate score as shown in column 925 measures are ranked. In this example, the computed aggregate score is ranked in ascending order from 1 to 12 as shown in column 930. The measures corresponding to higher ranks are considered for computing combination of analytical elements and for generating visual discoveries.

The computed aggregate scores and ranks of the measures based on a first sample dataset in FIG. 8 is compared with the computed aggregate scores and ranks of the measures based on a second sample dataset in FIG. 9. For example from FIG. 8 consider the first few measures 'MES A' with aggregate score of 8 and rank 1, 'MES B' with aggregate score of 10 and rank 2, and 'MES C' with aggregate score of 10 with rank 3. From FIG. 9 consider the first few measures 'MES A' with aggregate score of 9 and rank 1, 'MES B' with aggregate score of 10 and rank 2, and 'MES C' with aggregate score of 11 with rank 3. Though the aggregate score of 'MES A' is '8' in FIG. 8, and '9' in FIG. 9, because of computing statistical signatures and discretizing them, the rank of 'MES A' in FIG. 8 and FIG. 9 remains consistent as '1'. Similarly, for other analytical elements as well, though the aggregate score varies, the overall rank remains consistent.

Figure 10:
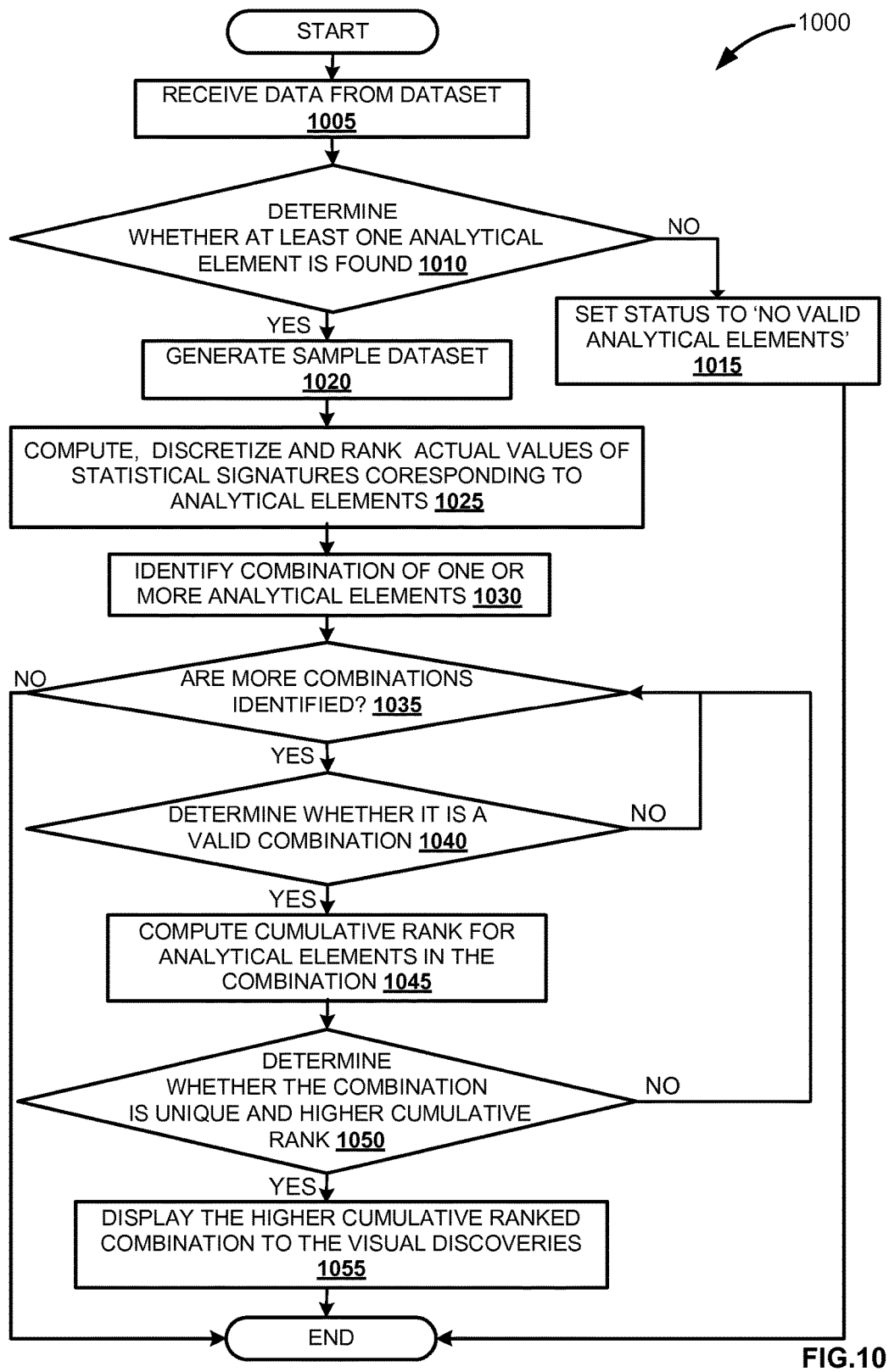
FIG. 10 is a flow diagram illustrating a process of determining combination of analytical elements for visual discoveries, according to one embodiment.

FIG. 10 is a flow diagram illustrating process 1000 of determining combination of analytical elements for visual discoveries, according to one embodiment. At 1005, data from a master dataset including analytical elements are received. At 1010, it is determined whether at least one valid analytical element is found in the master dataset. Upon determining that no valid analytical elements are found, at 1015, status of the master dataset is set to 'no valid analytical elements' and the process is terminated. Upon determining that at least one valid analytical element is found, at 1020, a sample dataset is generated from the master dataset. At 1025, actual values of statistical signatures are computed for the analytical elements. The actual values of statistical signature are discretized, and aggregate score is computed, and the analytical elements are ranked. This computing, discretizing and ranking at 1025, is shown in FIG. 4 to FIG. 8 and FIG. 11. At 1030, combination of one or more analytical elements is identified such as 'MESA DIM A', 'MES B MES C', etc.

At 1035, it is determined whether any combinations are identified. Upon determining that combinations are not identified, terminate the process. Upon determining that combinations are identified, at 1040, it is determined whether the identified combination is a valid combination. Upon determining that it is a valid combination, at 1045, a cumulative rank is computed where the individual ranks of analytical elements in the combination are summed. Computation of cumulative rank by summing is merely exemplary, various other techniques such as weighted ranking, average, etc., can be used. At 1050, it is determined whether the identified combination is unique and is of higher cumulative rank. Upon determining that the identified combination is not unique and is not of higher cumulative rank, at 1035, it is determined whether more combinations are available. Upon determining that the identified combination is unique and is of higher cumulative rank, at 1055, the identified combination is displayed as visual discoveries in the result window 220 of FIG. 2.

The combination of analytical elements with higher cumulative ranks or higher ranks are used in visual discoveries. The predetermined number of combination of analytical elements with higher ranks are displayed as visual discoveries in the result window 220 of FIG. 2. Therefore, irrespective of the sample dataset used, the analytical elements or the combination of analytical elements with higher ranks are used in visual discoveries, resulting in consistent visual discoveries. In one embodiment, the aggregate scores computed using any other techniques such as normalization, assigning weights to buckets, sorting based on a specified criteria, etc., may result in varying aggregate scores for different sample datasets, however, the overall rank or ordering of the analytical elements remains consistent, resulting in consistent visual discoveries.

In one embodiment, step size can be automatically learned and dynamically changed. Automatic learning (auto learning) can use machine learning techniques or user defined techniques. In order to achieve consistent visual discoveries, step size may be dynamically changed, i.e., they are adaptive in nature. For example, with a step size of 0.5 if the visual discoveries generated from a first sample dataset and a second sample dataset are 50-60% consistent, then the step size is automatically changed to a greater or lesser value to achieve a better consistency of 80-90%. For example, the step size 0.5 is automatically changed to 0.1 and it is auto learned that the measures are 80% consistent, and when the step size is automatically changed to 0.25 it is auto learned that the measures are 70% consistent. Since changing the step size to 0.1 yields a better consistency, the step size is automatically changed from 0.5 to 0.1. Based on the learned values of consistency, step sizes are automatically adjusted to achieve maximum consistency.

Since the dimensions such as 'DIM A', 'DIM B', 'DIM C' have a value of '0' for the actual value of kurtosis it is not considered for discretization in the above example, however, other techniques of discretization are used for these dimensions as explained below. For example, distinct count can be used on the dimension 'DIM C' of FIG. 3. In FIG. 3 'DIM C' has values such as Texas, New York, California, etc. Distinct counts of these values are determined, and the determined distinct counts are used in computing statistical signatures such as kurtosis, skewness, etc. The distinct count of Texas is determined as '12', the distinct count of 'New York' is determined as '10', the distinct count of California is determined as '14'. These distinct count values such as '12', '10', '14', etc., are used in computing statistical signatures such as kurtosis, skewness, etc., similar to the computation shown in FIG. 3.

Figure 11:
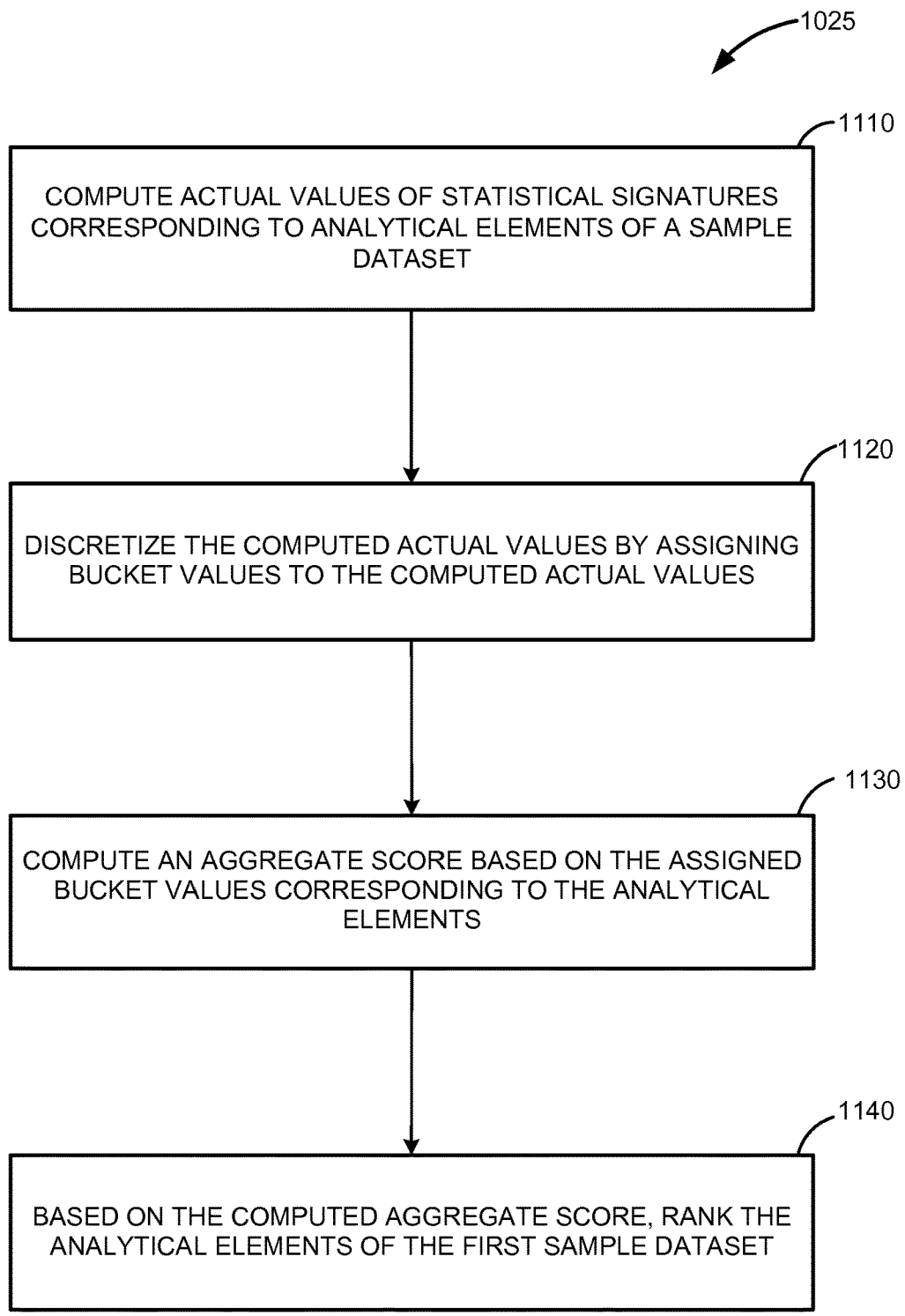
FIG. 11 is a flow diagram illustrating a process of computing, discretizing and ranking analytical elements, according to one embodiment.

FIG. 11 is a flow diagram illustrating process 1025 (FIG. 10) of computing, discretizing and ranking analytical elements, according to one embodiment. 1025 of FIG. 10 is described in detail here. At 1110, actual values of statistical signatures are computed. The actual values of statistical signatures correspond to analytical elements of a sample dataset. At 1120, the computed actual values are discretized by assigning bucket values to the computed actual values. At 1130, an aggregate score based on the assigned bucket values is computed. The assigned bucket values correspond to the analytical elements. At 1140, the analytical elements of the sample dataset are ranked, based on the computed aggregate score. Discretizing the computed actual values by assigning bucket values as specified in 1120 of FIG. 11 is illustrated below in FIG. 12.

Figure 12:
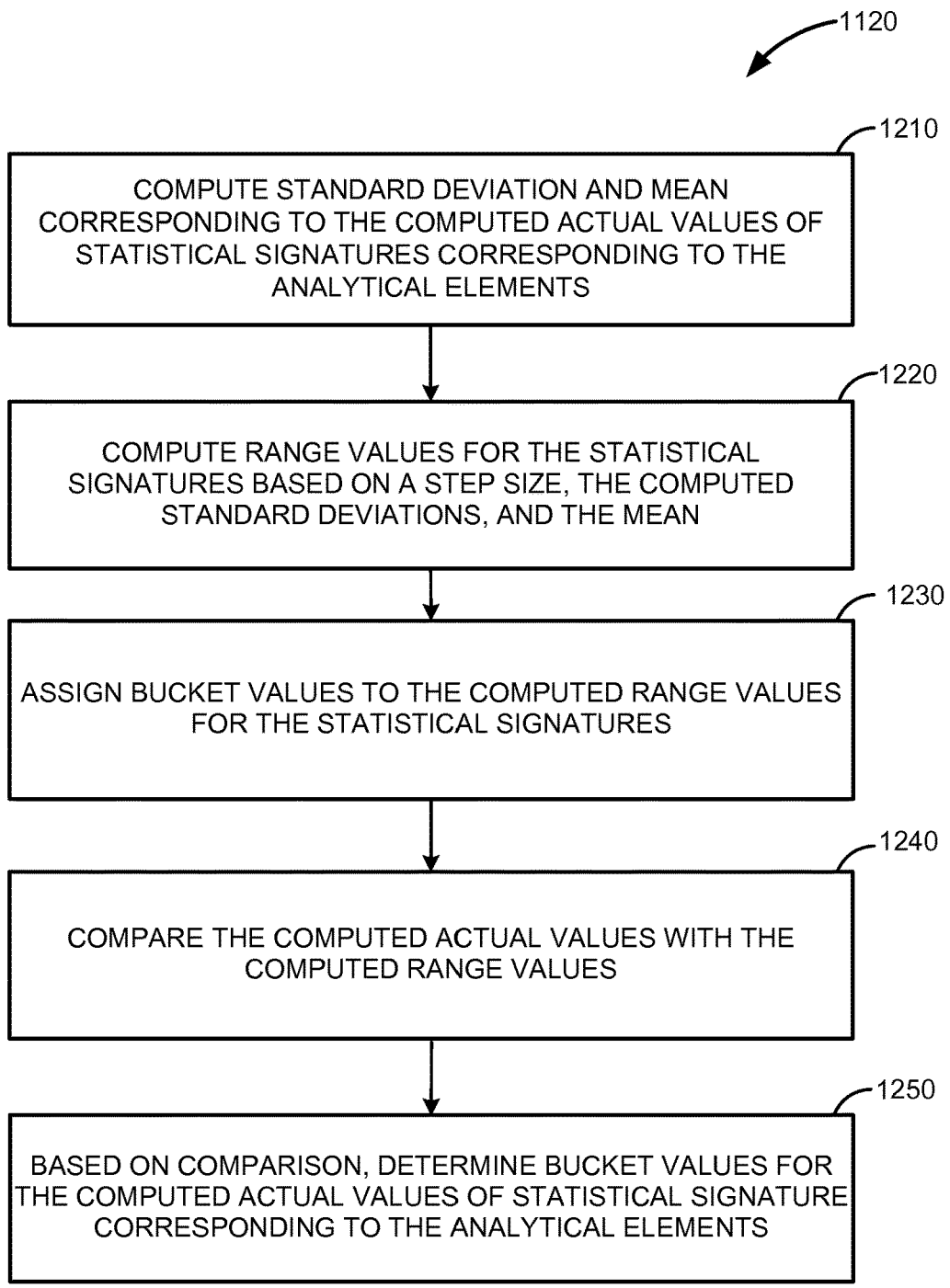
FIG. 12 is a flow diagram illustrating a process of discretizing computed actual values of statistical signature, according to one embodiment

FIG. 12 is a flow diagram illustrating process 1120 (FIG. 11) of discretizing the computed actual values of statistical signature corresponding to the analytical elements, according to one embodiment. At 1210, standard deviation and mean corresponding to the computed actual values of statistical signatures is computed. The computed actual values of statistical signatures correspond to the analytical elements. At 1220, range values for the statistical signatures are computed based on a step size, the computed standard deviation, and the mean. At 1230, bucket values are assigned to the computed range values for the statistical signatures. At 1240, the computed actual values are compared with the computed range values. At 1250, based on comparison, bucket values for the computed actual values of statistical signature is determined.

The various embodiments described above have a number of advantages. Enterprise data repositories have data in range of terabytes or petabytes; therefore, sample dataset which is representative of the enterprise data repository is used to generate visualizations. Whenever analyst initiates 'auto discovery', different sample datasets are considered for visualization. However, regardless of different the sample datasets, the analytical elements displayed in visual discoveries remain consistent. Analyst is provided with almost consistent visual discoveries every time, resulting in a better and enhanced user experience. Any inconsistencies in the displayed visual discoveries would be minimal irrespective of the sample dataset.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 13:
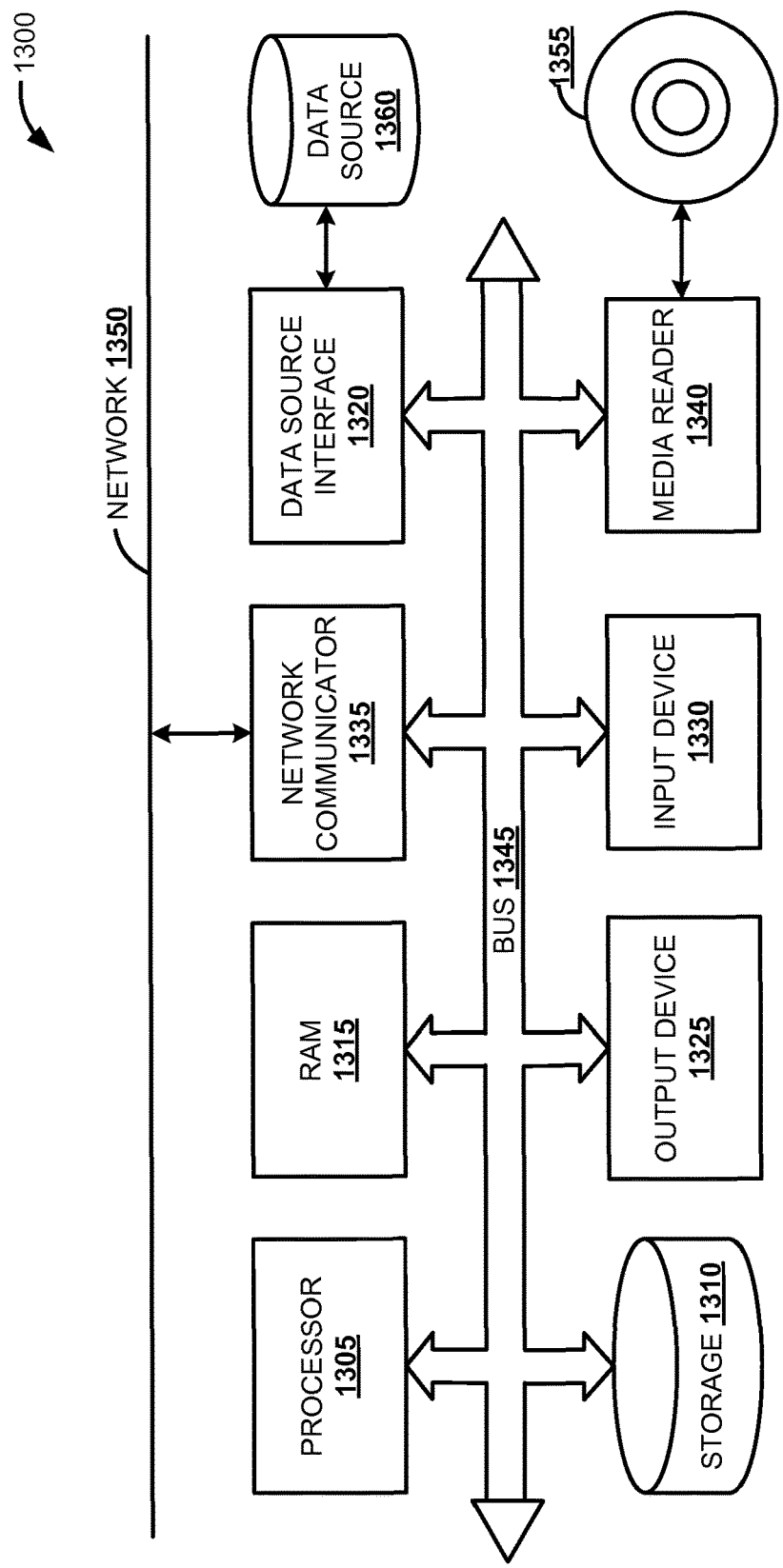
FIG. 13 is a block diagram illustrating an exemplary computer system, according to one embodiment.

FIG. 13 is a block diagram of an exemplary computer system 1300. The computer system 1300 includes a processor 1305 that executes software instructions or code stored on a computer readable storage medium 1355 to perform the above-illustrated methods. The computer system 1300 includes a media reader 1340 to read the instructions from the computer readable storage medium 1355 and store the instructions in storage 1310 or in random access memory (RAM) 1315. The storage 1310 provides a large space for keeping static data where at least some instructions could be stored for later execution. The stored instructions may be further compiled to generate other representations of the instructions and dynamically stored in the RAM 1315. The processor 1305 reads instructions from the RAM 1315 and performs actions as instructed. According to one embodiment, the computer system 1300 further includes an output device 1325 (e.g., a display) to provide at least some of the results of the execution as output including, but not limited to, visual information to users and an input device 1330 to provide a user or another device with means for entering data and/or otherwise interact with the computer system 1300. Each of these output devices 1325 and input devices 1330 could be joined by one or more additional peripherals to further expand the capabilities of the computer system 1300. A network communicator 1335 may be provided to connect the computer system 1300 to a network 1350 and in turn to other devices connected to the network 1350 including other clients, servers, data stores, and interfaces, for instance. The modules of the computer system 1300 are interconnected via a bus 1345. Computer system 1300 includes a data source interface 1320 to access data source 1360. The data source 1360 can be accessed via one or more abstraction layers implemented in hardware or software. For example, the data source 1360 may be accessed by network 1350. In some embodiments the data source 1360 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
    establish a connection from a data analytics application to an in-memory database via an in-memory database service;
    initiate a query from a user interface of the data analytics application for automatic visual discovery in the in-memory database;

in response to the query, compute actual values of statistical signatures corresponding to analytical elements of a first sample dataset wherein the statistical signatures used consist of one or more of kurtosis, skewness or distinct count;

discretize the computed actual values by assigning bucket values to the computed actual values;

compute range values for the statistical signatures based on a step size, wherein the step size is automatically adjusted to determine maximum consistency across the first sample dataset and a second sample dataset;

compute an aggregate score based on a sum of the assigned bucket values corresponding to the analytical elements;

based on the computed aggregate score, rank the analytical elements of the first sample dataset; and automatically display a menu of a consistent set of visual discoveries comprising a combination of analytical elements in the user interface of the data analytics application based on the ranking, wherein analytical elements from the consistent set are selectable to display corresponding graphical representations in an adjacent portion of a graph window.

2. The computer-readable medium of claim 1, wherein discretizing the computed actual values further causes the computer to:

compute standard deviation and mean corresponding to the computed actual values of statistical signatures corresponding to the analytical elements;

compute the range values for the statistical signatures based on the computed standard deviation and the mean; and assign bucket values to the computed range values for the statistical signatures.

3. The computer-readable medium of claim 2, wherein discretizing the computed actual values further causes the computer to:

compare the computed actual values with the computed range values; and based on comparison, determine bucket values for the computed actual values of statistical signature corresponding to the analytical elements.

4. The computer-readable medium of claim 3, wherein computing aggregate score further causes the computer to:

rank the analytical elements of the sample dataset based on the computed sum of the bucket values, wherein the analytical elements with higher rank are identified for a combination of analytical elements.

5. The computer-readable medium of claim 4, wherein ranking the analytical elements further causes the computer to:

identify the combination of analytical elements;

compute cumulative rank based on the individual rank of the analytical elements in the combination; and display the combination of analytical elements with higher rank automatically in the user interface associated with automatic visual discoveries.

6. The computer-readable medium of claim 1, wherein the analytical elements comprise dimensions and measures.

7. A computer-implemented method of improved consistency of visual discoveries, the method comprising:

establish a connection from a data analytics application to an in-memory database via an in-memory database service;

initiate a query from a user interface of the data analytics application for automatic visual discovery in the in-memory database;

in response to the query, computing actual values of statistical signatures corresponding to analytical elements of a first sample dataset wherein the statistical signatures used consist of one or more of kurtosis, skewness or distinct count;

discretizing the computed actual values by assigning bucket values to the computed actual values;

computing range values for the statistical signatures based on a step size, wherein the step size is automatically adjusted to determine maximum consistency across the first sample dataset and a second sample dataset;

computing an aggregate score based on a sum of the assigned bucket values corresponding to the analytical elements;

based on the computed aggregate score, ranking the analytical elements of the first sample dataset; and automatically displaying a menu of a consistent set of visual discoveries comprising a combination of analytical elements in the user interface of the data analytics application based on the ranking, wherein analytical elements from the consistent set are selectable to display corresponding graphical representations in an adjacent portion of a graph window.

8. The method of claim 7, wherein discretizing the computed actual values comprises:

computing standard deviation and mean corresponding to the computed actual values of statistical signatures corresponding to the analytical elements;

computing the range values for the statistical signatures based on the computed standard deviation and the mean; and assigning bucket values to the computed range values for the statistical signatures.

9. The method of claim 8, wherein discretizing the computed actual values further comprises:

comparing the computed actual values with the computed range values; and based on comparison, determining bucket values for the computed actual values of statistical signature corresponding to the analytical elements.

10. The method of claim 8, wherein computing aggregate score further comprises:

ranking the analytical elements of the sample dataset based on the computed sum of the bucket values, wherein the analytical elements with higher rank are identified for a combination of analytical elements.

11. The method of claim 10, further comprises:

identifying the combination of analytical elements;

computing cumulative rank based on the individual rank of the analytical elements in the combination; and displaying the combination of analytical elements with higher rank automatically in the user interface associated with automatic visual discoveries.

12. The method of claim 7, wherein the analytical elements comprise dimensions and measures.

13. A computer system for improved consistency of visual discoveries, comprising:

a computer memory to store program code; and a processor to execute the program code to:

establish a connection from a data analytics application to an in-memory database via an in-memory database service;

initiate a query from a user interface of the data analytics application for automatic visual discovery in the in-memory database;

in response to the query, compute actual values of statistical signatures corresponding to analytical elements of a first sample dataset wherein the statistical signatures used consist of one or more of kurtosis, skewness or distinct count;

discretize the computed actual values by assigning bucket values to the computed actual values;

compute range values for the statistical signatures based on a step size, wherein the step size is automatically adjusted to determine maximum consistency across the first sample dataset and a second sample dataset;

compute an aggregate score based on a sum of the assigned bucket values corresponding to the analytical elements;

based on the computed aggregate score, rank the analytical elements of the first sample dataset; and automatically display a menu of a consistent set of visual discoveries comprising a combination of analytical elements in the user interface of the data analytics application based on the ranking, wherein analytical elements from the consistent set are selectable to display corresponding graphical representations in an adjacent portion of a graph window.

14. The system of claim 13, wherein discretizing the computed actual values comprises:

compute standard deviation and mean corresponding to the computed actual values of statistical signatures corresponding to the analytical elements;

compute the range values for the statistical signatures based on the computed standard deviation and the mean; and assign bucket values to the computed range values for the statistical signatures.

15. The system of claim 14, wherein discretizing the computed actual values further comprises:

compare the computed actual values with the computed range values; and based on comparison, determine bucket values for the computed actual values of statistical signature corresponding to the analytical elements.

16. The system of claim 15, wherein computing aggregate score further comprises:

rank the analytical elements of the sample dataset based on the computed sum of the bucket values, wherein the analytical elements with higher rank are identified for a combination of analytical elements.

17. The system of claim 16, wherein ranking the analytical elements further causes the computer to:

identify the combination of analytical elements;

compute cumulative rank based on the individual rank of the analytical elements in the combination; and display the combination of analytical elements with higher rank automatically in the user interface associated with automatic visual discoveries.

* * * * *